(12) United States Patent
Kusaka et al.

(10) Patent No.: US 6,898,488 B2
(45) Date of Patent: May 24, 2005

(54) POWER GENERATION PLANT REMOTE OPERATION SYSTEM

(75) Inventors: Satoshi Kusaka, Hitachi (JP); Masayuki Fukai, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 317 days.

(21) Appl. No.: 10/078,378

(22) Filed: Feb. 21, 2002

(65) Prior Publication Data

US 2003/0033056 A1 Feb. 13, 2003

(30) Foreign Application Priority Data

Aug. 7, 2001 (JP) ........................................ 2001-239543

(51) Int. Cl.[7] .............................................. G05D 11/00
(52) U.S. Cl. ...................................... 700/286; 700/287
(58) Field of Search ................................ 700/286, 287, 700/292–294, 297

(56) References Cited

U.S. PATENT DOCUMENTS 6,665,635 B2 * 12/2003 Shimizu et al. ............. 702/188
2002/0035495 A1 * 3/2002 Spira et al. .................... 705/7
2002/0052673 A1 * 5/2002 Seong et al. ................ 700/292
2002/0107615 A1 * 8/2002 Bjorklund ................... 700/286
2002/0134083 A1 * 9/2002 Staphanos et al. ........... 60/698

* cited by examiner

Primary Examiner—Leo Picard
Assistant Examiner—Zoila Cabrera
(74) Attorney, Agent, or Firm—Mattingly, Stanger, Malur & Brundidge, P.C.

(57) ABSTRACT

A plurality of thermal power generation plants 100 are provided with a communication terminal 200 and a function of controlling respectively a boiler control unit 110, a turbine control unit 120 and an auxiliary machine sequence control unit 130 based on an operation signal inputted via the communication terminal 200. A remote control center 10 which is connected to the communication terminal 200 via the Internet 300, accessses the control units and remotely controls operating states including starting and stopping of the concerned thermal power generation plant 100.

8 Claims, 5 Drawing Sheets

POWER GENERATION PLANT REMOTE OPERATION SYSTEM

BACKGROUND OF THE INVENTION

1. Field of the Invention

The present invention relates to a thermal power generation plant remote operation system and, in particular, relates to a remote control system for starting and stopping a plurality of such plants and fee collection processing applied to such system.

2. Conventional Art

Figure 5:
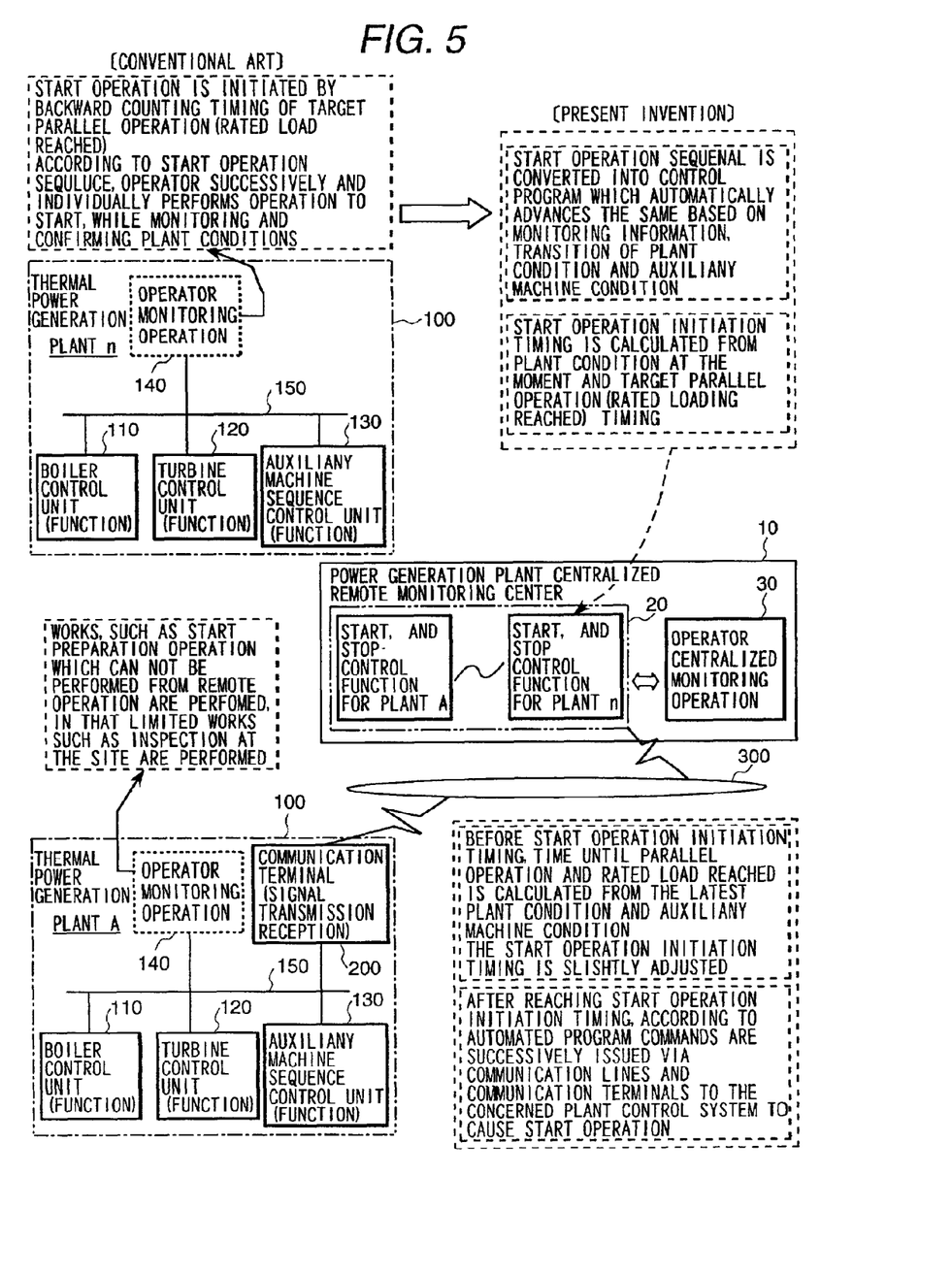
FIG. 5 is a diagram for explaining a starting and stopping control function of the remote centralized monitoring center according to the present embodiment in comparison with a conventional example.

Starting and stopping operation of a thermal power plant associates with a variety of concerned installations which relate each other, and includes temperature rising and lowering operations of machines and apparatuses having large thermal capacities, because such thermal power generation unit fundamentally combusts fuel, convents the thermal energy into mechanical energy and finally into electrical energy. In connection with the starting operation, as shown in FIG. 5, for every single thermal power generation plant 100 respective control units such as a boiler control unit (function) 110, a turbine control unit (function) 120 and an auxiliary sequence control unit (function) 130 connected to a power generation plant network 150 are operated from an operator monitoring operation unit 140, and a starting operation is initiated by performing backward counting from a target paralleling (rated load reaching) timing. Then, an operator successively operates individual units and starts the plant while monitoring and confirming the plant condition according to a starting operation sequence. With regard to the starting, it takes even in a most rapid instance about one hour after initiating starting preparation and actually performing parallel making in the line until building up to a target output, and depending on the standstill condition it takes a few hours, during this starting period, it is required to perform monitoring and confirming of the conditions of processes and machines over items in the number of from several tens to several hundreds as well as after correctly judging these information to open and close values and to start and stop pumps and fans in the number of several tens to several hundreds. The operation of stopping is substantially the same as the starting operation as explained above.

The starting and stopping operation can be achieved only after correctly judging the plant condition and performing a proper operation as has been explained above, however, depending on a manner of operation the time required for the starting and stopping operation may be prolonged, and contrary because of rapid starting and stopping the life time of the machines such as a turbine and a boiler sometime results in to be shortened as has been planned. The requirement from a power transmission system side is to keep paralleling (or a target load reaching) timing and decoupling (paralleling off) timing as a target timing of performing starting and stopping operation, in that it is required, when electric power demand is increasing, to properly make parallel and to increase output and to thereby perform electric power generation corresponding to the demand load, and when the electric power demand is decreasing, to perform decoupling and to decrease the output rapidly. One of the most important problems is to make paralleling at a required timing without delay after initiating a starting operation of the concerned electric power generation unit as well as to perform decoupling at the required timing after initiating a stopping operation.

When starting a unit, a boiler is warmed up and a turbine in a form of rotating body is rotated from a standstill condition to an rpm corresponding to a frequency of the concerned power transmission line, however, conditions (such as temperature and internal pressure) of the boiler and turbine in a form of solid body and associating machines and apparatuses vary depending on such as standstill period, manner of stopping operation, existence and absence and kinds of works during standstill, therefore, the manner of starting operation varies depending on the conditions above and the time required for the starting is also varies.

Steady state operation of an electric power generation plant is mostly automated by a dedicated control unit for a boiler and a turbine without necessitating intervention of an operator, however, with regard to the starting and stopping operation, since highly intelligent judgements and greatly many operations are required, such operations are performed individually either by operators at each of the concerned plant, while monitoring the plant condition or by installing such as control use computer and automating control unit which are provided with a function of causing automated starting and stopping operation and by making use of the same by operators at each of the concerned plants. Technology of the control use computer and automating control unit which are provided with a function of causing automated starting and stopping operation has already been established, therefore, it is possible to perform starting and stopping according to a predetermined sequence without needing intervention of operators or by requiring the operators a few selections.

Operation in an electric power generation plant is roughly divided into the following four stages;

(1) during a steady state loading operation,
(2) starting process,
(3) stopping process, and
(4) standstill condition.

Among these stages, since the standstill condition is one in which the plant is stopped, neither operation nor monitoring are required. During the steady state loading, since a large scale process in which fuel is combusted and the thermal energy is converted into mechanical energy and then to electrical energy, the monitoring thereof is always required. However, other than the transient condition from static to dynamic and from dynamic to static a machine operation is stable which is true for all of machine operations, therefore, number of items to be operated is a few. Accordingly, a plant monitoring during a steady state loading operation does not, in particular, require operators to attend all the time but requires to watch important parameters whether the same are stable until detecting an abnormality.

Contrary, when starting a plant, it is necessary to perform a proper operation timely after carefully checking conditions of machines and a apparatuses, auxiliary machines and processes in the plant which also depends on the condition when the plant was stopped, and such requires operators to have high technology and a correct judgement and operation. When stopping a plant, although the requirement is slightly low, it is necessary to perform correct operation with reference to a lot of information. On one hand, an intermediate load service in which starting and stopping operation is frequently repeated tends to become common in a thermal electric power generation plant, therefore, in order to perform correctly such starting and stopping operation, it is the first thing to obtain experienced operators.

However, since training of such operators requires substantial time and cost, and other than large electric power companies there are no training facilities and also these are many entrepreneurs who want to enter into electric power generation business such as industry use and IPP, but have anxieties how to practice actual operation after starting the operating. Further, even if operators are obtained, when the plant is started every day and is stopped every night, although such depends on the plant application, one cycle of starting-steady state operation-stopping requires about 16 hours, therefore, the operators are required to work in two or three shifts with one team of about 3 through 5 operators. If the plant is to be operated on Saturday and Sunday, number of teams has to be increased such as three to four teams so as to permits to take holidays by turn which requires to obtain many operators such as 9 to 20 and costs a substantial personnel expense. Even in large electric power companies owning many power generation plants, acquiring of operators is difficult and payment of personal expense cost is a large burden, therefore, they are continuously trying to reduce number of operators per unit such as by centralizing a plurality of plants and an intermediate level management of a plurality of plants.

Further, although there has been a control use computer and automating control unit which has a function of performing an automated starting and stopping operation, except for a plant which is required to perform starting and stopping operation every day, such provision of an expensive installation having the automating function is not profitable for starting and stopping operation every one week or a few times in a year. Moreover, it is not a best way in view of personnel expense to station many excellent persons as operators in an electric power generation plant for starting the plant from early morning. Although, even during a steady state operation operators are required to monitor many operating conditions, however, when the machines and apparatuses are normally operated, information to be watched is limited, therefore, such condition can be sufficiently covered by a less operators.

Accordingly, in these power generation plants it is desired that when an operation management of electric power generation plant including starting and stopping operation by a limited number of operator attendance required for steady state loading operation, the starting and stopping operation of the concerned electric power generation plant never becomes a burden of these operators.

Further, when automating the starting and stopping operation of a plant, it is required to perform a variety of adjustments depending on the characteristics of the concerned plant, however, under a circumstance where the construction period is shortened year by year and time for test run can not be shared sufficiently, it is becomes difficult to perform adjustment which reflects the plant characteristic at the time of test run completion and permits an optimum starting and stopping from any plant conditions. Further, the application (frequency of starting and stopping operations) of thermal electric power generation plants varies for every plant and further the application at the time of planning varies depending on electric power demand circumstance. For example, an electric power generation plant planned for a base application can be changed to an intermediate loading application (service). Therefore, it is necessary to perform an optimum starting and stopping operation in response to such application change flexibly for life time management of the concerned plant and for maintenance cost reduction, therefore, in order to study, plan and adjust these problems professional engineers are needed. However, it is difficult to obtain such engineers for the individual electric power generation plants, therefore, at present it is hard to say that an optimum starting and stopping operation is performed in many electric power generation plants.

SUMMARY OF THE INVENTION

The present invention is carried out in view of the above referred to background, and an object of the present invention is to provide a power generation plant remote operation system in which the starting and stopping operation of electric power generation plants is performed remotely and automatically depending on the circumstance of machines and apparatuses of the respective plants or the same is performed semiautomatically and properly after being provided with a guidance.

Another object of the present invention is to provide a power generation plant remote operation system as built as referred to above which incorporates fee collecting measure for the services performed in the concerned system.

These days, since control units are completely digitalized, plant information can be carried on a power generation plant network, and because of development of communication means such as internet and satellite communication an environment has been prepared in which information of electric power generation stations can be easily accessed from remote places, even if there are no dedicated lines, even when a unit which monitors operation of electric power generation plants and a unit which automatically performs starting and stopping control of the electric power generation plants are installed remote from the electric power generation plants, information of the electric power generation plants can be inputted to the units by making use of the communication means such as an internet. In the remotely installed units many of plant data are stored, and experts and operators who have experiences of such as designing, planning and operating the plants are stationed, grasp the conditions of the concerned electric power generation plant by making use of the data sent from a remote location of the electric power generation plant, select a starting and stopping method meeting a required starting and stopping plan and execute the same. Further, after analyzing the starting and stopping operation records, design condition, state of machines and apparatuses and the current starting and stopping content, an adjustment is performed to determine an optimum starting and stopping. Still further, these starting and stopping records are reported to the concerned electric power generation plant as well as an improvement of starting and stopping method is proposed to the concerned electric power generation plant. By receiving agency consideration of the starting and stopping operation and a predetermined share according to agreement of the profit obtained by the improvement of the starting and stopping operation, the remote starting and stopping services can be realized as a business.

More specifically, the present invention is characterized in that a power generation plant remote operation system is constituted by a plurality of thermal power generation plants each of which is provided with a communication terminal and a function of controlling respective elements based on an operation signal inputted via the communication terminal and a remote control center which is connected to the communication terminal via a communication line, accesses the elements representing control objects in the respective thermal power generation plants and remotely controls operating states including starting and stopping of the concerned thermal power generation plant.

In place of the above remote control of the operating states including starting and stopping the concerned thermal power generation plant, the system can be constituted in such a manner that after performing a guidance of starting and stopping operation for the concerned thermal power generation plant, the control of the operation states including starting and stopping the plant is remotely aided. Further, as the communication line, a network line including an internet and a satellite communication line can be used. Still further, the remote control center is also provided with a function of monitoring the states of the respective elements and/or the operating states of the thermal power generation plants.

Further, the thermal power generation plant pays a consideration to the remote control center based on its own operating state controlled by the remote control center. A reference operating state of the above consideration payment is set based on, for example, any one of number of auxiliary machines in the plant, complexity of control object line system, magnitude of output of the plant, and amount of signals of the plant.

Still further, the thermal power generation plant can be designed to pay a consideration to the remote control center based on the amount of cost saving by an improvement proposal presented by the remote control center.

DETAILED DESCRIPTION OF THE PREFERRED EMBODIMENTS

Hereinbelow, embodiments of the present invention will be explained with reference to the drawings in which the communication terminal corresponds to a communication terminal 200, and the respective elements correspond to a boiler control unit 110, a turbine control unit 120 and an auxiliary machine control unit 130. Further, in the following description, parts equivalent to those of the conventional example as has been explained in connection with FIG. 5 are designated by the same reference numerals thereof and duplicate description will be occasionally omitted.

Figure 1:
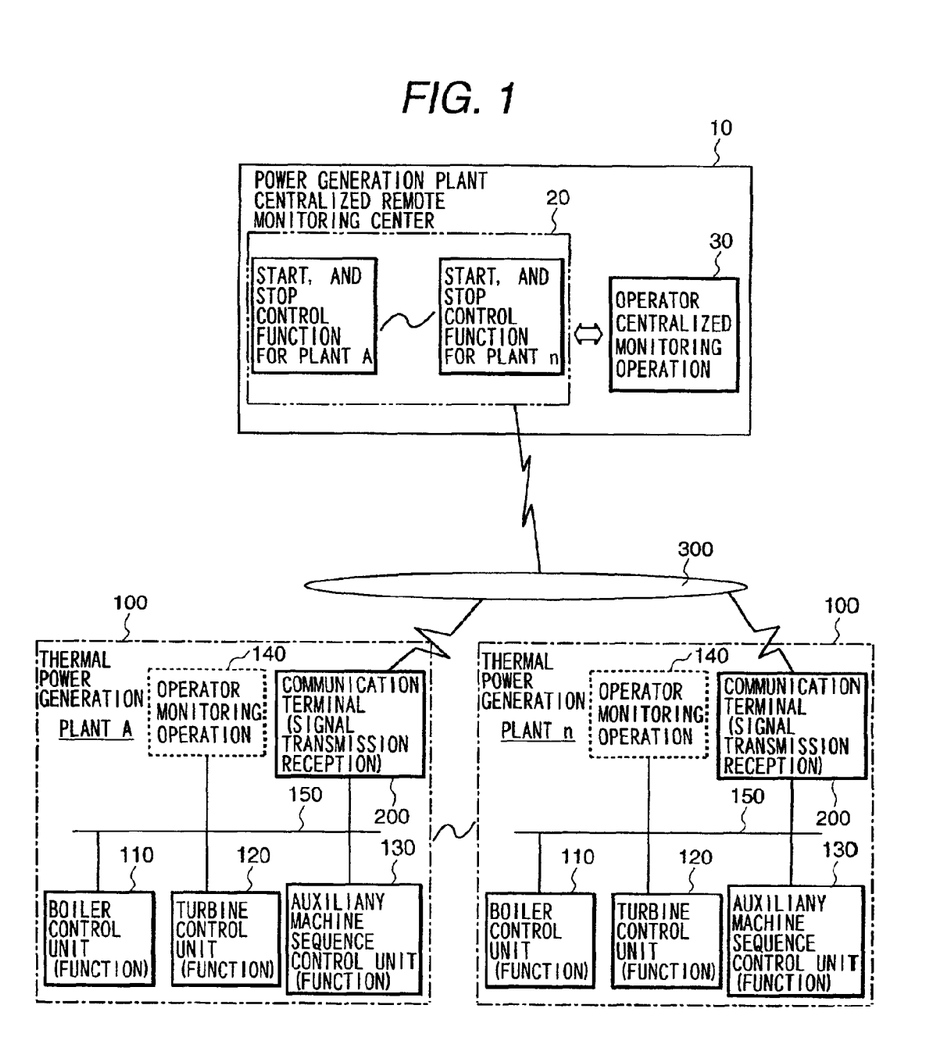
FIG. 1 is a diagram showing a system structure of a thermal power generation plant remote control and operation system representing one embodiment of the present invention.

FIG. 1 is a diagram showing a schematic structure of a thermal power generation plant remote control and operation system representing an embodiment of the present invention. The present system is constituted by a power generation plant remote centralized monitoring center 10 and a plurality of thermal power plants A through n (hereinbelow will be generally designated by reference numeral 100) which are connected to permit mutual communication via a network line including an internet working as a communication line. Further, in place of or in addition to the internet 300, the system can be built so as to include a satellite communication line or alternatively the network can be built by a dedicated line.

The power generation plant remote centralized monitoring center 10 is provided with a starting and stopping control unit 20 and an operator centralized monitoring operation unit 30, the starting and stopping control unit 20 includes a plant A starting and stopping control unit 20A through a plant n starting and stopping control unit 20n each corresponds to each plant in the plurality of thermal power generation plants 100, and the operator centralized monitoring and operating unit 30 is designed to permit accessing to the respective plant starting and stopping control units 20A through 20n.

On the hand, each of the thermal power generation plants (A through n) is provided with a boiler control unit (function) 110, a turbine control unit (function) 120 and an auxiliary sequence control unit (function) 130 and is controlled by these respective control units 110, 120 and 130. Under a steady state operation sufficient operation and monitoring can be performed by these functions. However, when performing starting and stopping operation, it is necessary that operators perform a variety of operations at a proper timing depending on the plant state as has been explained above, and the operator monitoring and operating unit 140 is operated and monitored by a plurality of operators. In the present embodiment, since the starting and stopping operation is performed by the power generation plant remote centralized monitoring center 10, a communication terminal 200 is further provided for each network 150 in the respective power generation plants 100, thus the power generation plant remote centralized monitoring center 10 is constituted to collect power generation plant information via a communication line such as an internet 300 and to send an operation command to the respective power generation plants.

Figure 3:
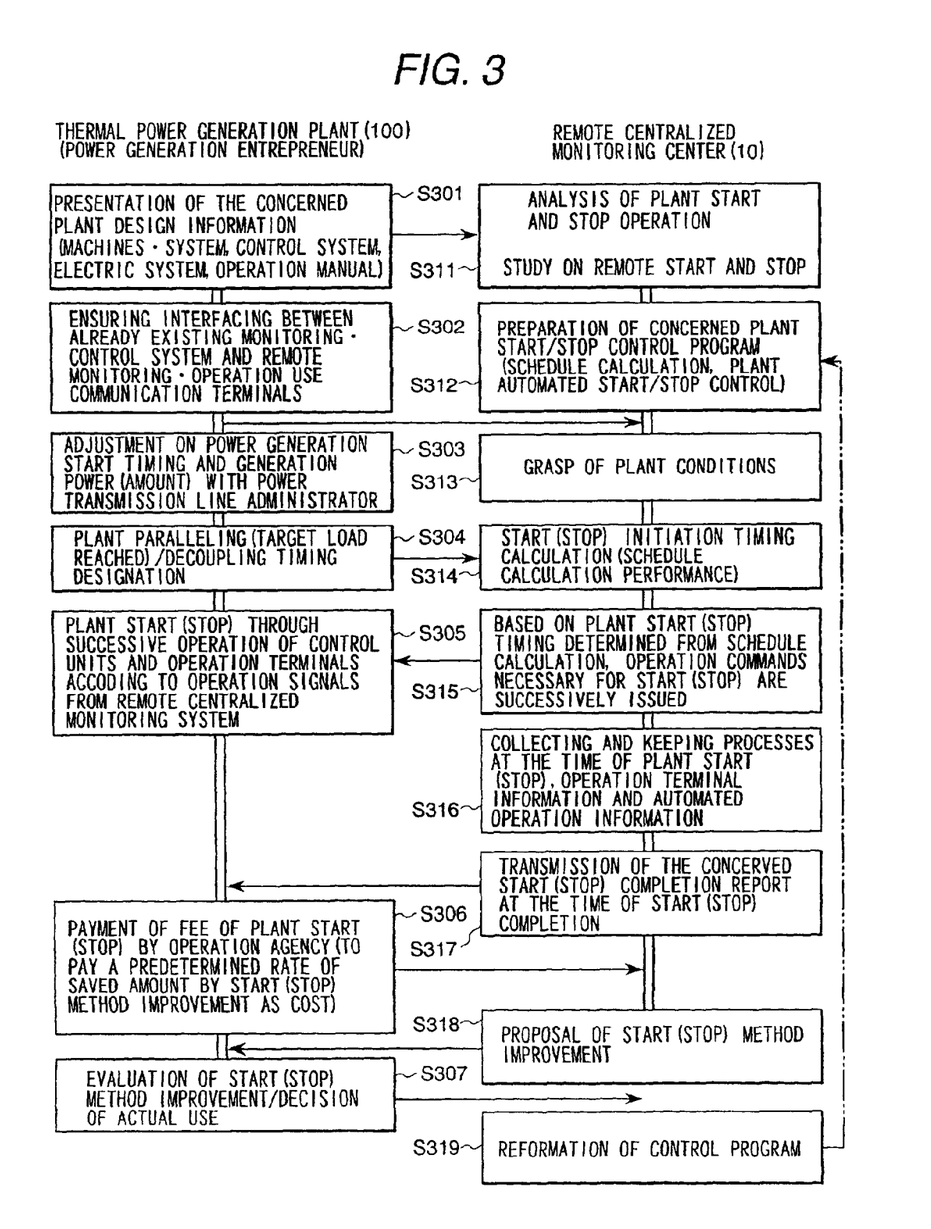
FIG. 3 is a diagram showing a relationship of information transmission and reception between a thermal power generation plant (power generation entrepreneur) and a remote centralized monitoring center in the power generation plant remote control and operation system representing the embodiment of the present invention.
Figure 4:
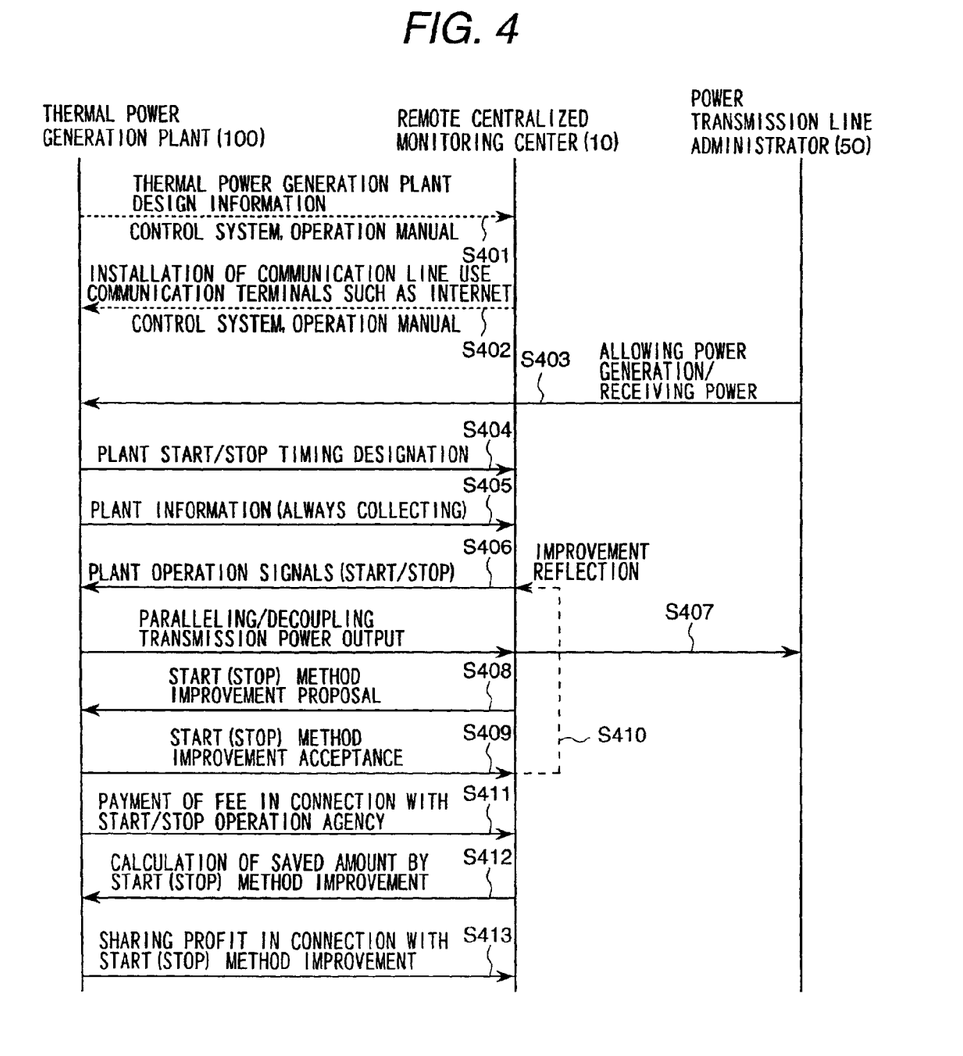
FIG. 4 is a diagram showing schematically a role assignment between a thermal power generation plant, a remote centralized monitoring center and a power transmission system administrator relating to the power generation plant remote control and operation system representing the embodiment of the present invention.

The remote centralized monitoring center 10 performs operations and information transmission and reception as shown in FIG. 3, acquires in advance control and operation sequence of the respective thermal power generation plants 100 and stores a starting and stopping control program in the starting and stopping control unit 20. When actually performing a starting and stopping, other than information exchange between a concerned power generation plant 100 and the remote centralized monitoring center 10 an information exchange with a power transmission system administrator 50 is of course necessitated as shown in FIG. 4, however, a plant is fundamentally operated and managed through information exchange as shown in FIG. 3.

Namely, as shown in FIG. 3, the side of the thermal power generation plant presents plant design information to the remote centralized monitoring center 10 (step S 301), and ensures an interfacing between the already existing monitoring and control system and the remote monitoring and operation use communication terminal (step S 302). Further, the plant design information includes information on machine and apparatus system, control system, electrical system and control and operation manual, and in order to build the present system the provision of the communication terminal 200 which is permitted to perform communication via a communication line such as the internet 300 is a precondition. Further, when an interfacing is ensured at step S 302 and a power generation permission/receiving power indication is informed from the side of the power transmission system administrator 50 to the side of the thermal power generation plant 100, an adjustment with regard to power generation starting time and generation power amount is performed with the power transmission system administrator 50 (step S 303), and timing of plant parallel making (a target load reaching)/decoupling is indicated (step S 304). Still further, plant information is also sent from the side of the thermal power generation plant 100 to the side of the remote centralized monitoring center 10.

When the timing of parallel making or decoupling comes, the control units and control terminals are successively operated by an operation signal from the remote centralized monitoring system 10 to start or to stop the concerned plant (step S 305). Thereafter, the side of the thermal power generation plant 100 pays a consideration in association with the operation agency of starting and stopping the plant (step S 306), and further, advances to evaluate an improving method of starting and stopping operation and to decide whether or not to apply the improving method (step S 307). Further, the payment of the consideration at step S 306 includes a consideration for the improvement proposal which is agreed to pay a predetermined rate of the effective saving amount when there is an accepted proposed improvement in the starting and stopping method.

On the other hand, the side of the remote centralized monitoring center 10, after receiving the presentation of the plant design information at step S 301, analyzes the plant starting and stopping operation and studies a remote starting and stopping (step S 311). Then, a starting/stopping program for the concerned plant is prepared (step S 312). In this instance, the program includes a schedule calculation and plant automated starting/stopping control programs. After preparing the programs in such a manner and an interfacing is ensured at step S 302, the state of the plant is grasped at step S 313 and when the timing of plant parallel making/decoupling at step S 304 is inputted, calculation (schedule calculation) of starting and stopping operation initiating timing is performed at step S 314. Then, an operation command necessary for starting or stopping are successively issued based on the plant starting or stopping timing determined from the schedule calculation (step S 315). The operation command corresponds to the operation signal for the remote centralized system in step S 305 and in a thermal power generation plant starting or stopping of the plant is performed based on the operation signal.

Further, in the remote centralized monitoring center 10, process information at the time of plant starting or stopping, operation terminal information and automating operation information are collected and kept (step S 316). Then, at the same time when starting or stopping operation has been completed, the starting or stopping operation completion report is transmitted to the side of the thermal power generation plant (step S 317). The thermal power generation plant side received of the above completion report performs the payment of consideration referred to above based on the completion report in the same manner as in step S 306. Further, when an improvement measure in connection with the starting and stopping method is found out, the improvement measure is proposed to the side of the power generation entrepreneur (step S 318), and if the improvement measure is accepted by the power generation entrepreneur side and is decided for application (step S 307), the remote centralized monitoring center side reforms the control program based on the indication (step S 318), and a plant starting and stopping program is prepared at step S 312, thereafter, the processing is executed according to the reformed program.

Information exchange during such instance between the thermal power generation plant 100, the remote centralized monitoring center 10 and the power transmission system administrator 50 is performed as shown in FIG. 4.

Namely, when the design information of the thermal power generation plant including the control system and control and operation manual is transmitted from any of the thermal power generation plants 100 which are objects for operation in the same manner as in step S 301 (step S 401), the side of the remote centralized monitoring center 10 confirms the provision of the communication line use communication terminal 200 such as an internet (step S 402), wherein it is confirmed that communication relation between the respective thermal power generation plants 100 and the remote centralized monitoring center 10 is ensured via a communication line. Under such condition, when a power generation permission or a power acceptance is indicated from the side of the power transmission system administrator 50 to the thermal power generation plant 100 (step S 403), plant starting/stopping timing designation information is transmitted from the side of the thermal power generation plant 100 to the remote centralized monitoring center 10 (step S 404) as well as plant information continuously collected is likely transmitted (step S 405).

Based on these information received the remote centralized monitoring center side 10 transmits to the thermal power generation plant side 100 a plant control and operation signal for performing starting and stopping (step S 406), based on the transmitted signal the thermal power generation plant side starts or stops the same and transmits the state of plant paralleling or decoupling as well as the state of transmitting power output to the power transmission system administrator 50 (step S 407). Further, the improvement proposal at step S 318 is transmitted from the remote centralized monitoring center side 10 to the thermal power generation plant side 100 (step S 408), and if the proposal is accepted by the thermal power generation plant side 100 as in the above step S 307 (step S 409), the control program is reformed at step S 319, and a new plant control and operation signal is transmitted (step S 406) while reflecting the reformation result (step S 410).

Further, the thermal power generation plant side 100 pays the consideration in connection with the agency of the plant starting and stopping at step S 411 to the remote centralized monitoring center side 10. Further, when the improvement proposal is accepted at step S 409, the remote centralized monitoring side 10 calculates cost saving amount saved by the improvement proposal and informs the same to the thermal power generation plant side 100 (step S 412). The thermal power generation plant side 100 pays based on the information a predetermined amount of memory of, for example, an agreed upon percentages of the profit corresponding to the cost saving to the remote centralized monitoring center side 10 (step S 413).

The consideration to be paid to the remote centralized monitoring center side 10 in connection with the operation agency of the plant starting and stopping at step S 306 is set depending on such as the scale of the respective thermal power generation plants 100 and their operation conditions. Specifically, the consideration is set, for example, according to the following parameters;

Number of plant starting/stopping
Number of plant auxiliary machines and apparatuses
Complexity of plant line system
Magnitude of output
Total amount of signals in plant.

Further, step S 401 in FIG. 4 corresponds to the information presentation from step S 301 to step S 311 in FIG. 3, step S 404 corresponds to the time notification from step S 304 to step S 314, step S 406 corresponds to the signal transmission processing from step S 315 to step S 305, step S 411 corresponds to the processing to the remote centralized monitoring center side 10 at step S 306, step S 408 corresponds to the proposal to the thermal power generation side at step S 318, step S 410 corresponds to the processing from step S 319 to step S 312 and step S 412 and step S 413 correspond to the processing at step S 306.

Although the starting and stopping operation of a thermal power generation plant requires very complex judgement and performance of many operations, however, when such is performed by the remote centralized monitoring center 10, if operators at the operator centralized monitoring unit 30 performs operation after confirming respective monitoring information one by one, such shows no difference when stationing operators at the concerned thermal power generation plant for performing the starting and stopping operation and there is no importance to provide the remote centralized monitoring center 10. Further, when performing the centralized monitoring of many power generation plants, it is impossible to attend to only one thermal power generation plant, therefore, the remote centralized monitoring center 10 is provided with the above referred to starting and stopping control unit 20. The function of this unit will be explained with reference to FIG. 5.

In the present embodiment, the operation sequence for starting and stopping which was conventionally performed by operators is inputted as a control program of the power generation plant into the starting and stopping control unit 20. The control program causes to automatically advance the starting operation sequence based on the plant condition and transition of monitoring information on the auxiliary machine and apparatus condition. The control program judges information of the objective thermal power generation plant 100 which is inputted via a communication line such as the internet 300, outputs a starting and stopping operation command at a proper timing and automatically starts and stops the plant. Further, the timing of the starting operation initiation or the stopping operation initiation of a thermal power generation plant was conventionally determined after the operators at the concerned thermal power generation plant 100 judges the plant condition from the target parallel making time and decoupling time, however, since it is difficult that the operators at the remote centralized monitoring center 10 manage such individual conditions one by one, therefore, the target paralleling timing or the decoupling timing of the concerned plant is acquired in advance from the control objective thermal power generation plant 100 and is inputted into the above referred to starting and stopping control unit 20. The starting and stopping control unit 20 calculates timing of the plant starting operation initiation or the stopping operation initiation through which the paralleling or decoupling is performed at the designated timing, and starts or stops the plant at a proper timing while relating with the control program for automatically starting and stopping the plant.

The operators at the remote centralized monitoring center 10 monitor through the operator centralized monitoring operation unit 30 whether the automated plant starting and stopping is performed smoothly and in case when any inconvenience happens the operators either intervene manually or provide proper information and advise (guidance) to the concerned thermal power generation plant 100. Further, since the remote centralized monitoring center 10 possesses the starting and stopping records, the operation records and design data of the concerned thermal power generation plant as well as keeps record data of many other power generation plants, the remote centralized monitoring center 10 can analyze these data occasionally and can propose an improvement measure of starting and stopping method for the concerned plant. With regard to this improvement measure, if any of the thermal power generation plants 100 decides to apply the same as has been explained in connection with step S 307, the improvement measure is practiced by adjusting the control program and the timing management program of the starting and stopping control unit 20 in the remote centralized monitoring center 10 in the manner as explained in connection with step S 319 and step S 312. On the other hand, the operator monitoring operation 140 by the operators at the side of the thermal power generation plant 100 is very limited works such as works which can not be performed by remote control such as starting preparation work and inspection at the site.

As has been explained above, if the starting and stopping operation is performed remotely by the remote centralized monitoring center 10, number of operators at respective thermal power generation plants can be suppressed to the limited number required for steady state operation. In addition, since the starting and stopping operation can be performed by professional engineers, reliability of the starting and stopping operation can be ensured. Further, when repeating the starting and stopping operations, better starting and stopping operations are performed step by step, thereby, the operation cost is reduced for the respective power generation plants, thus the side of providing remote centralized monitoring services can enjoy shares of the cost saving profit by the improvement.

Figure 2:
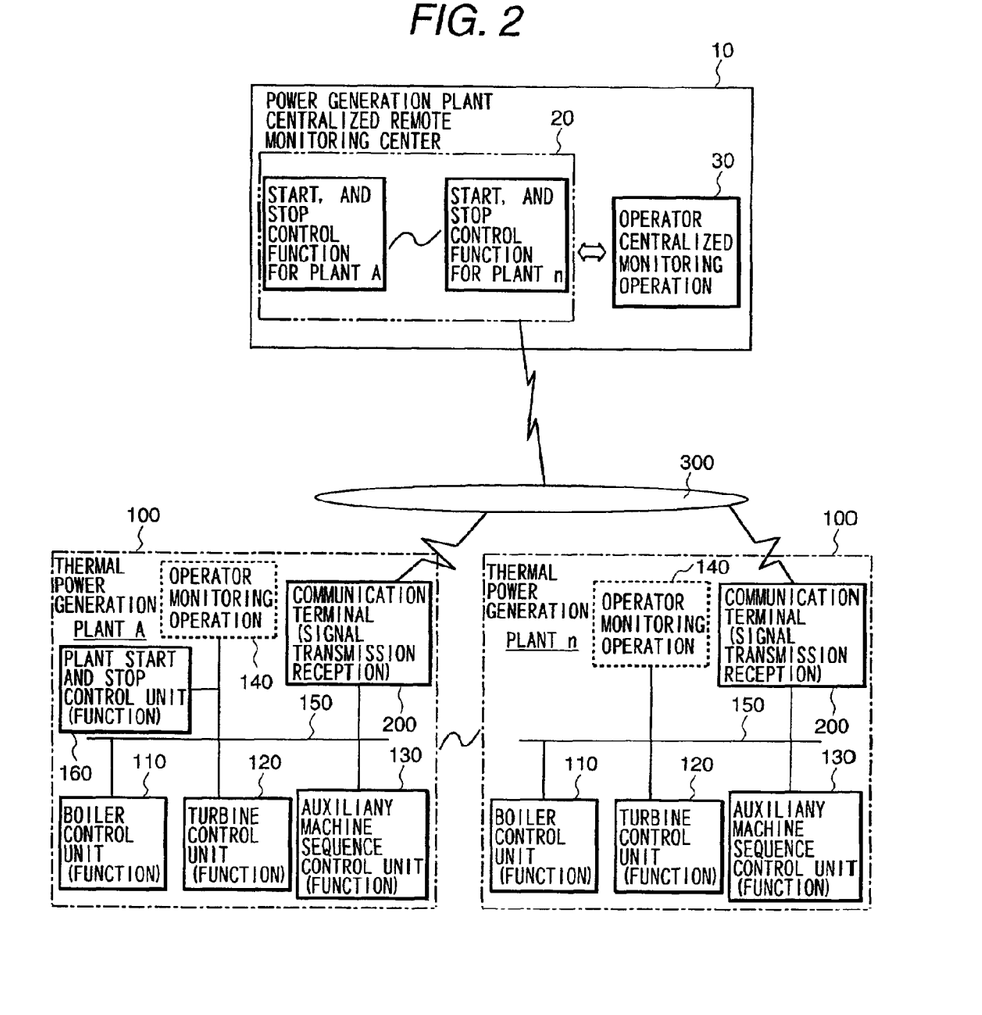
FIG. 2 is a diagram showing a modified system structure of FIG. 1 embodiment.

In FIG. 2, a plant starting and stopping control (function) 160 is provided in the thermal power generation plant A and the remote control operation is realized while including the plant in which the plant starting and stopping control is already automated, in such instance including such a plant, the present invention functions in the same way when the same is applied to the case in which the plant starting and stopping control is not automated, and the same advantages as in FIG. 1 embodiment can be obtained.

Further, in the systems as shown in FIGS. 1 and 2, the remote centralized monitoring center 10 for power generation plants is provided independent from respective thermal power generation plants, the same can be provided in one of the plurality of thermal power generation plants 100.

As has been explained hitherto, according to the present invention, since the power generation plant remote operation system is constituted by a plurality of thermal power generation plants each of which is provided with a communication terminal and a function of controlling respective elements based on an operation signal inputted via the communication terminal and a remote control center which is connected to the communication terminal via a communication line, accesses elements representing control objects in the respective thermal power generation plants and remotely controls operating states including starting and stopping of the concerned thermal power generation plants, the starting and stopping operation of the power generation plants can be performed remotely and automatically in response to the circumstances of the machines and apparatuses of the respective plants.

Further, according to the present invention, in place of the above remote control of the operating states including starting and stopping the concerned thermal power generation plant, since the system can be constituted in such a manner that after performing a guidance of starting and stopping operation for the concerned thermal power generation plant, the control of the operation states including starting and stopping the plant is remotely aided, the starting and stopping operation is performed semiautomatically and properly after being provided with a guidance.

Further, according to the present invention, since the thermal power generation plant pays a consideration to the remote control center based on its own operating state controlled by the remote control center or based on the amount of cost saving by an improvement proposal presented by the remote control center, the consideration for the services performed by the remote control center can be correctly collected.

Still further, according to the present invention, in place of a manager and operators at the concerned power generation station, since an optimum starting and stopping operation at each moment can be prepared at a top level by professional engineers based on the accumulated data representing plant condition and characteristic as well as without reconstruction the control unit within the power generation station, the present invention contributes to personnel cut of operators and maintenance persons, reduces losses at the time of plant starting and stopping, shortens starting and stopping time and enhances reliability.

What is claimed is:

1. A power generation plants remote control and operation system connected to a plurality of thermal power generation plants via communication lines to permit mutual communication and remote control of the plurality of thermal power generation plants comprising:

a centralized monitoring device which performs centralized monitoring of operation states of the plurality of thermal power generation plants; and said centralized monitoring device includes a plurality of start and stop control devices for remotely controlling start and stop operations of the plurality of thermal power generation plants, wherein a number of the start and stop control devices corresponds to the number of the plurality of thermal power generation plants, and wherein each of the plurality of start and stop control devices is provided with a control program setting a start and stop control and operation sequence for each corresponding one of the plurality of thermal power generation plants.

2. A power generation plant remote control and operation system of claim 1, wherein the communication lines are constituted by a network line including an internet.

3. A power generation plant remote control and operation system of claim 1, wherein the communication lines are constituted by a network line including a satellite communication line.

4. A power generation plant remote control and operation system of claim 1, wherein the centralized monitoring device monitors states of respective control objects and/or operating states of the thermal power generation plants.

5. A power generation plant remote control and operation system of claim 1, wherein a consideration payment made to the centralized monitoring service of the thermal power generation plant is set based on an operating state controlled by the power generation plant remote control and operation systems.

6. A power generation plant remote control and operation system of claim 5, wherein a reference operating state of the consideration payment is set based on at least one of a number of auxiliary machines in the plant, complexity of control object line system, magnitude of output of the plant, and amount of signals of the plant.

7. A power generation plant remote control and operation system of claim 1, wherein a consideration payment to be paid to the centralized monitoring service of the thermal power generation plant is set based on the amount of cost savings by attributed to the power generation plant remote control and operating systems.

8. A power generation plant remote control and operation system, comprising:

a plurality of thermal power generation plants each of which is provided with a communication terminal and a function of controlling respective elements based on an operation signal inputted via the communication terminal; and a remote control center which is connected to the communication terminal via a communication line, that accesses the elements representing control objects in the respective thermal power generation plants and remotely controls operating states including starting and stopping of the corresponding thermal power generation plants, wherein, the remote control center includes a plurality of start and stop control devices for remote controlling of start and stop operations of the plurality of thermal power generation plants, a number of which corresponds to the number of the plurality of start and stop control devices, and said start and stop control devices are provided with a control program setting a start and stop control and operation sequence for the corresponding thermal power generation plants.

* * * * *